(12) United States Patent
Chu et al.

(10) Patent No.: US 11,164,089 B2
(45) Date of Patent: *Nov. 2, 2021

(54) TRANSACTION DATA ANALYSIS (71) Applicant: INTERNATIONAL BUSINESS MACHINES CORPORATION, Armonk, NY (US)

(72) Inventors: Yea-Jane Chu, Chicago, IL (US); Sier Han, Xian (CN); Ning Sun, Beijing (CN); Chun Hua Tian, Beijing (CN); Feng Juan Wang, Beijing (CN); Ming Xie, Beijing (CN); Chao Zhang, Beijing (CN); Xiu Fang Zhu, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1159 days.

This patent is subject to a terminal disclaimer.

(21) Appl. No.: 14/880,721

(22) Filed: Oct. 12, 2015

(65) Prior Publication Data
US 2017/0103403 A1    Apr. 13, 2017

(51) Int. Cl.
*G06N 5/02* (2006.01)
*H04L 12/26* (2006.01)

(52) U.S. Cl.
CPC ............ *G06N 5/025* (2013.01); *H04L 43/10* (2013.01); *H04L 43/12* (2013.01)

(58) Field of Classification Search
CPC ............ G06K 9/00536; G06K 9/6297; G06K 9/00335; G06K 9/00771; G06K 9/6218;
(Continued)

(56) References Cited

U.S. PATENT DOCUMENTS 6,189,005 B1 * 2/2001 Chakrabarti ........ G06F 16/2477
6,278,997 B1 * 8/2001 Agrawal ............ G06F 16/2465
(Continued)

OTHER PUBLICATIONS

Desai NA, Ganatra A. Buying scenario and recommendation of purchase by constraint based sequential pattern mining from time stamp based sequential dataset. Procedia Computer Science. Jan. 1, 2015;45(C):166-75. (Year: 2015).*
(Continued)

*Primary Examiner* — Ann J Lo
*Assistant Examiner* — Oluwatosin O Alabi
(74) *Attorney, Agent, or Firm* — Cantor Colburn LLP; Joseph Petrokaitis (57) ABSTRACT

Embodiments include predicting transactions by an entity and identifying promotions to offer the entity. Aspects include parsing a plurality of event records corresponding to a plurality of entities respectively. Aspects also include identifying a sequence of events corresponding to the entity and discretizing time durations and event values of the sequence of events into discrete symbolic values. Aspects further include generating a temporal pattern of events in the sequence of events, the temporal pattern including a sequence of transaction-symbols representative of the time duration and the event value of the events in the sequence of events of the entity and predicting a next transaction based on the temporal pattern.

14 Claims, 10 Drawing Sheets

(58) Field of Classification Search
CPC .............. G06K 9/6284; G06K 9/6878; G06K
19/06009; G06K 9/0057; G06K 9/6224;
G06K 9/6269; G06Q 30/0202; G06Q
10/04; G06Q 30/0201; G06Q 40/06;
G06Q 50/01; G06Q 30/0226; G06Q
30/0185; G06Q 40/025; G06F 17/30551;
G06F 17/30539; G06F 21/552; G06F
2221/2151; G06F 17/30; G06F 17/30598;
G06F 19/00; G06F 3/015; G06F 11/3024;
G06F 11/3419; G06F 17/2705; G06F
17/277; G06F 17/2785; G06F 17/30017;
G06F 17/30569; G06F 21/556; G06F
21/85; H04L 63/1408; H04L 63/1416;
H04L 63/1425; H04L 12/16; H04L 43/10;
H04L 43/12; H04L 67/42; H04L 41/14;
G06N 5/025
See application file for complete search history.

(56) References Cited

U.S. PATENT DOCUMENTS

| | | | |
|---|---|---|---|
| 7,907,140 B2 | 3/2011 | Landau et al. | |
| 8,001,062 B1 | 8/2011 | Gargi et al. | |
| 8,027,949 B2* | 9/2011 | Kiernan | G06Q 10/10 706/58 |
| 8,335,757 B2* | 12/2012 | Su | G06F 16/90344 707/602 |
| 8,489,452 B1* | 7/2013 | Warner | G06Q 30/0226 705/14.34 |
| 2002/0107841 A1* | 8/2002 | Hellerstein | G06K 9/62 |
| 2003/0023591 A1* | 1/2003 | Ma | G06F 7/02 |
| 2005/0027710 A1* | 2/2005 | Ma | G06F 17/18 |
| 2005/0235356 A1* | 10/2005 | Wang | G06F 16/2477 726/22 |
| 2009/0157681 A1* | 6/2009 | Park | G06Q 30/02 |
| 2014/0019569 A1* | 1/2014 | Sharma | G06F 9/5066 709/208 |
| 2014/0039274 A1 | 2/2014 | Sarrafzadeh et al. | |
| 2015/0019513 A1 | 1/2015 | Dey et al. | |
| 2015/0253366 A1* | 9/2015 | Agarwal | G01R 13/00 702/71 |
| 2016/0161375 A1* | 6/2016 | Harpale | G01M 99/008 702/183 |
| 2017/0161337 A1* | 6/2017 | Yao | G06F 16/24578 |
| 2018/0053114 A1* | 2/2018 | Adjaoute | G06N 3/126 |

OTHER PUBLICATIONS

Esling, P., & Agon, C. (2012). Time-series data mining. ACM Computing Surveys (CSUR), 45(1), 1-34. (Year: 2012).*

Huang Y, Zhang L, Zhang P. A framework for mining sequential patterns from spatio-temporal event data sets. IEEE Transactions on Knowledge and data engineering. Feb. 26, 2008;20(4):433-48. (Year: 2008).*

Lu, H., Feng, L., & Han, J. (2000). Beyond intratransaction association analysis: mining multidimensional intertransaction association rules. ACM Transactions on Information Systems (TOIS), 18(4), 423-454. (Year: 2000).*

Lee, A. J., Lin, W. C., & Wang, C. S. (2006). Mining association rules with multi-dimensional constraints. Journal of Systems and Software, 79(1), 79-92. (Year: 2006).*

List of IBM Patents or Patent Applications Treated as Related; (Appendix P), Filed Jan. 29, 2016; 2 pages.

Yea-Jane Chu et al., "Transaction Data Analysis ", U.S. Appl. No. 14/954,651, filed Nov. 30, 2015.

Guyet, Thomas et al. "Extracting Temporal Patterns From Interval-Based Sequences" Agrocampus-Ouest, 65 rue de Saint-Brieuc, CS 84215, 35 042 Rennes Cedex, France, pp. 1306-1311.

* cited by examiner

Input dataset 507

| Customer ID | Time | Type | Value |
|---|---|---|---|
| 1 | 2012-Feb-11 | Refilling | 100 |
| 1 | 2012-Mar-15 | Top-up | 800 |
| 1 | 2012-Mar-16 | Refilling | 350 |
| 1 | ...... | ...... | ...... |
| 2 | 2012-Feb-10 | Refilling | 50 |
| 2 | 2012-Feb-15 | Refilling | 50 |
| 2 | ...... | ...... | ...... |
| 3 | 2012-Feb-20 | Refilling | 300 |
| 3 | 2012-Mar-19 | Refilling | 200 |
| 3 | 2012-Mar-19 | Shopping | 7.5 |
| ...... | ...... | ...... | ...... |

Input parameter settings 610

- Value discretization: Persist
  -- min number: 3
  -- max number: 3
- Time interval discretization: Expert knowledge
  -- cut points: 24h, 168h

Output parameter values 620

|  | L | M | H |
|---|---|---|---|
| R (Top-up) | 0~500 | 500~1000 | >1000 |
| O (Refilling) | 0~200 | 200~450 | >450 |
| N (Shopping) | 0~10 | 10~50 | >50 |

Time interval: tl~ 0~24h, tm~ 24h~168h, th~ 168h~

Output dataset 630

| Customer ID | Time | Type | Value | Time Interval |
|---|---|---|---|---|
| 1 | 2012-Feb-11 | Refilling | L | NAN |
| 1 | 2012-Mar-15 | Top-up | M | th |
| 1 | 2012-Mar-16 | Refilling | M | tl |
| 1 | ...... | ...... | ...... | ...... |
| 2 | 2012-Feb-10 | Refilling | L | NAN |
| 2 | 2012-Feb-15 | Refilling | L | tm |
| 2 | ...... | ...... | ...... | ...... |
| 3 | 2012-Feb-20 | Refilling | M | NAN |
| 3 | 2012-Mar-19 | Refilling | L | th |
| 3 | 2012-Mar-19 | Shopping | L | tl |
| ...... | ...... | ...... | ...... | ...... |

| Cluster | Significant Patterns | Behavioral Features Observed from Significant Patterns | Possible Segment Inferred from Behaviors |
|---|---|---|---|
| 1 | OL-tl-OL<br>RM-tl-OL | • Frequent refueling with cost less than 200<br>• Top-up & refueling usually occur on the same day | Taxi drivers |
| 2 | OL-tl-OL | • Frequent refueling with cost less than 200<br>• Top-up amount should be large than 1000, as RM is not significant. | Business people |
| 3 | OL-tm-OL<br>OL-tm-RM | • Average 10km-20km/day;<br>• Refueling interval is average 1-7 weeks;<br>• Cost is unstable for refueling, as neither OL-tl-RM nor RM-tl-OL is significant. | White collar |
| 4 | OL-th-OL | • Infrequent refueling. | People occasionally use the car / use alternative refueling stations |

OL: Refilling Cost<=200
tm: [1 week , 7 weeks)
RM: 500 < Top-up <= 1000

Fig. 9

Fig. 10

TRANSACTION DATA ANALYSIS

BACKGROUND

The present invention relates generally to event-based time-series pattern identification, and more particularly to analysis of transaction data.

In today's information age, enterprises (such as businesses) have access to vast amounts of data, particularly about their customers and the transactions between the enterprise and a customer. Nowadays, enterprises pay significant attention to understanding their customers and perform customer segmentation, customer behavior prediction, demand shaping, personalized promotion, and other analyses to improve their businesses.

SUMMARY

According to an embodiment, a method includes parsing, by a processor, a plurality of event records corresponding to a plurality of entities respectively, an event record from the plurality of event records corresponding to a transaction performed by a respective entity, the event record including event type, a timestamp and an event value corresponding to the transaction. The method also includes identifying, by the processor, a sequence of events corresponding to the entity. The method also includes discretizing, by the processor, time durations and event values of the sequence of events of the entity into discrete symbolic values. The method also includes generating a temporal pattern in the sequence of events, the temporal pattern including a sequence of transaction-symbols representative of the time duration and the event value of the events in the sequence of events of the entity. The temporal pattern is identified base on a vertical support of the pattern being greater than a predetermined vertical support value.

According to another embodiment, a system includes an event data processor configured to generate an event data log based on transaction data of multiple entities, where the event data log includes event records, each event record corresponding to a transaction by a respective entity. The event data processor is further configured to identify a sequence of event records corresponding to each entity. The system also includes a temporal discretizer configured to transform the sequence of event records of each entity into a symbolic pattern, a symbolic pattern representative of a type, a value, and a time duration between consecutive transactions by each entity. The system also includes a pattern identifier configured to discover a frequent pattern based on all the entities' transaction records. The pattern identifier component is further configured to predict a next transaction by the entity based on the symbolic pattern matching with an antecedent transaction pattern.

According to yet another embodiment, a computer product includes non-transitory computer readable storage medium, the non-transitory computer readable storage medium including computer executable instructions. The non-transitory computer readable storage medium includes instructions to parse event information, where the event information includes information about transactions performed by a plurality of customers, and event information corresponding to a transaction includes a customer identifier, a timestamp, and a transaction value of the transaction. The non-transitory computer readable storage medium includes instructions to identify sequences of transactions performed by the customers based on the parsing of the event information. The non-transitory computer readable storage medium also includes instructions to identify a pattern of transactions performed by a customer and predict a time and transaction value of a future transaction for the customer based on the pattern of transactions and the sequences of transactions identified.

BRIEF DESCRIPTION OF THE DRAWINGS

The examples described throughout the present document may be better understood with reference to the following drawings and description. The components in the figures are not necessarily to scale. Moreover, in the figures, like-referenced numerals designate corresponding parts throughout the different views.

DETAILED DESCRIPTION

Disclosed herein are technical solutions that take event values linked to events and time interval/duration between two adjacent events into consideration and identifies and extracts patterns in the event-based time series (EBTS) data. An event in the EBTS data is an event that happens instantaneously, such as purchase of an item, deposit/withdrawal from/to a bank account, and other such instantaneous events. The EBTS data is a sequence of customer activities that are event-based and that are not evenly spaced. For example, in a gas station, customer activities include refill, top-up, and shop. These activities do not occur at specific intervals and thus, they are not evenly spaced.

In another example, in a bank, customer activities include depositing money, withdrawing money, transferring money, and other such activities. These activities do not occur in response to particular events and not per a predetermined schedule. In an online bank example, customer activities may further include clicking different buttons on the bank's website.

Figure 1:
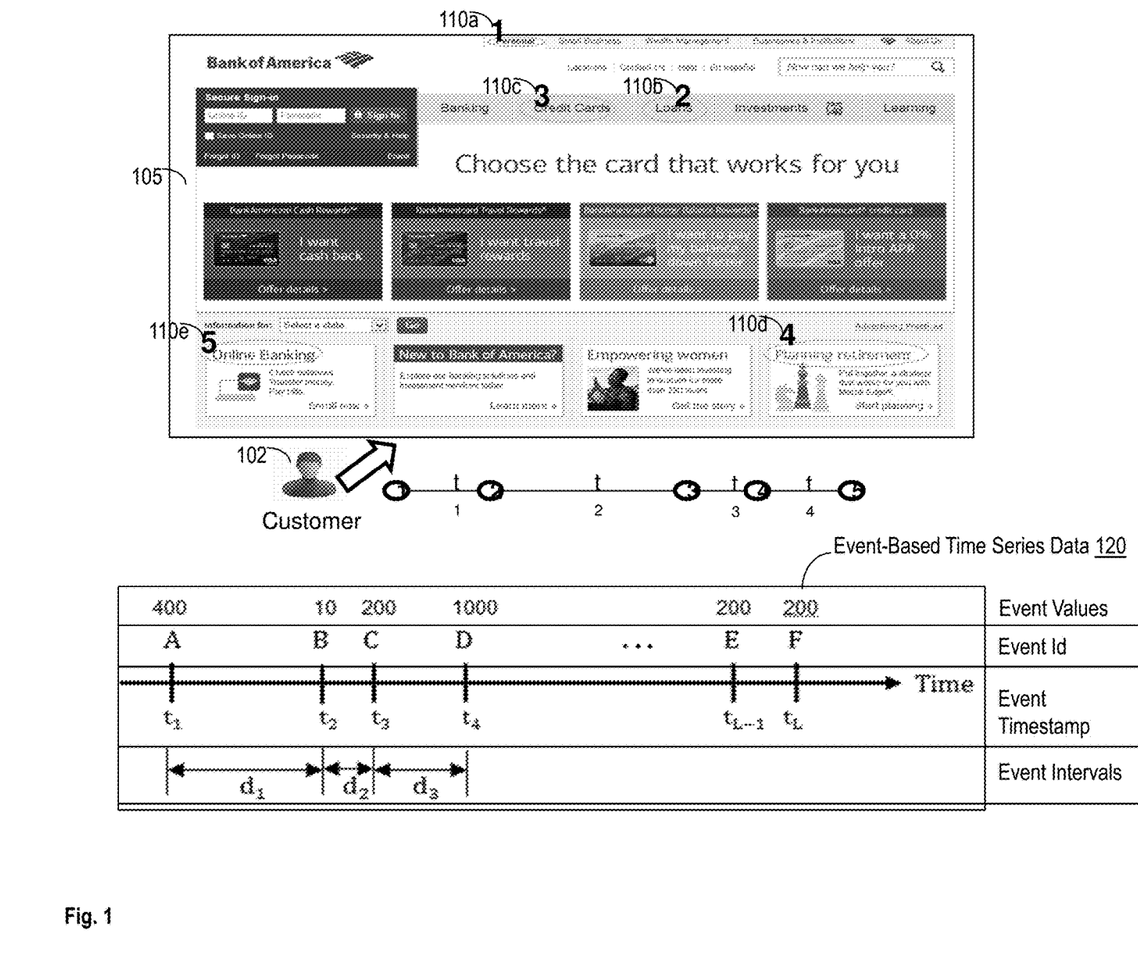
FIG. 1 illustrates an example event based time series (EBTS) data in accordance with an embodiment.

FIG. 1 illustrates an example of an EBTS data. The EBTS data for a customer transacting with an online bank is illustrated. In the illustration, a customer 102 interacts with a website 105 of the online bank. The customer 102 performs transactions 110a-e that involve interacting with the website 105. Each transaction 110a-e is an event. The sequence of the transactions is recorded as the EBTS data 120.

Figure 10:
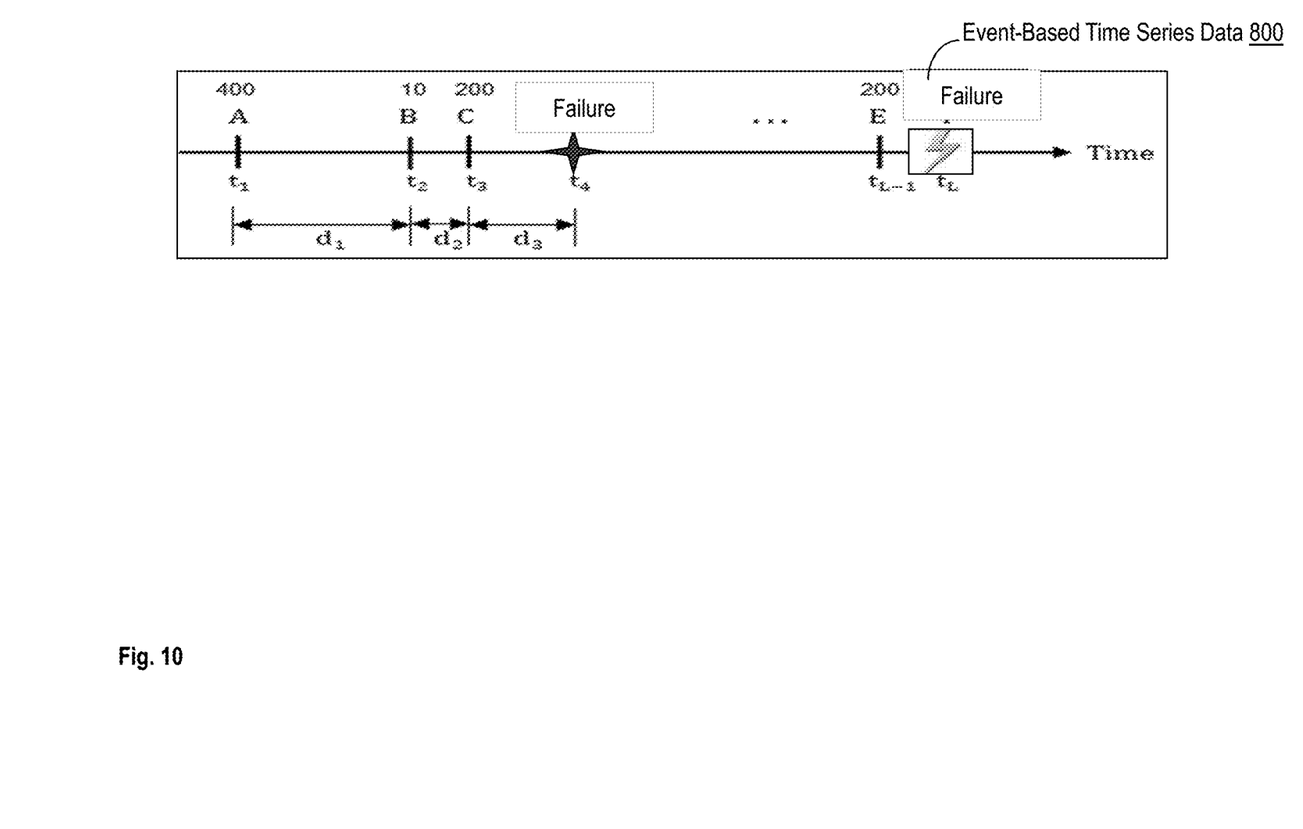
FIG. 10 illustrates an example EBTS data with failure type in accordance with an embodiment.

An event, such as an event 110a is associated with an event value. For example, the event values in this case may be amounts of money deposited, withdrawn, transferred, or other such amount value. The event value may be numeric, categorical (no need to do discretization), or vacant (events in patterns don't include symbolic values). For example, events may be classified as a voluntary event or a failure event. The voluntary event is representative of a transaction that a customer undertook voluntarily, such as a purchase at a gas station. The failure event is representative of a transaction that the customer undertook in response to a failure. For example, a failure in the customer's car in response to which the customer visited the gas station for oil change. In another example, FIG. 10 illustrates an example EBTS data 800 for a railroad company. The company may undertake two voluntary maintenance transactions which are preventive (scheduled regularly, say quarterly) and further undertake a failure event that is corrective (caused by engine failure).

The event 110a is further associated with a unique event identifier, and an event timestamp. For example, the event 110a may have an identifier A, and a timestamp t1 as illustrated. The timestamp indicates an instant at which the transaction corresponding to the event 110a completes. In other examples, the timestamp may indicate an initiation, or any other time associated with the event 110a. Based on the event timestamps, the duration between two events is calculated. For example, duration between event A and event B is d1 based on the respective timestamps of t1 and t2. The durations between consecutive (or adjacent) events are arbitrary.

Typically, EBTS data analysis is based on order of events to identify ordered sequences and/or using clustering techniques to generate clusters based on the sequences and other attributes in the data, automatically based on statistical significance.

The technical solutions described herein analyze the EBTS data 120 using order of the events 110a-e, content/type of the events 110a-e, relationship of adjacent events, length of time duration between the events 110a-e, and numeric value linked with the events 110a-e. The technical solutions, based on the analysis, identify a pattern in the EBTS 120, such as a temporal pattern.

Figure 2:
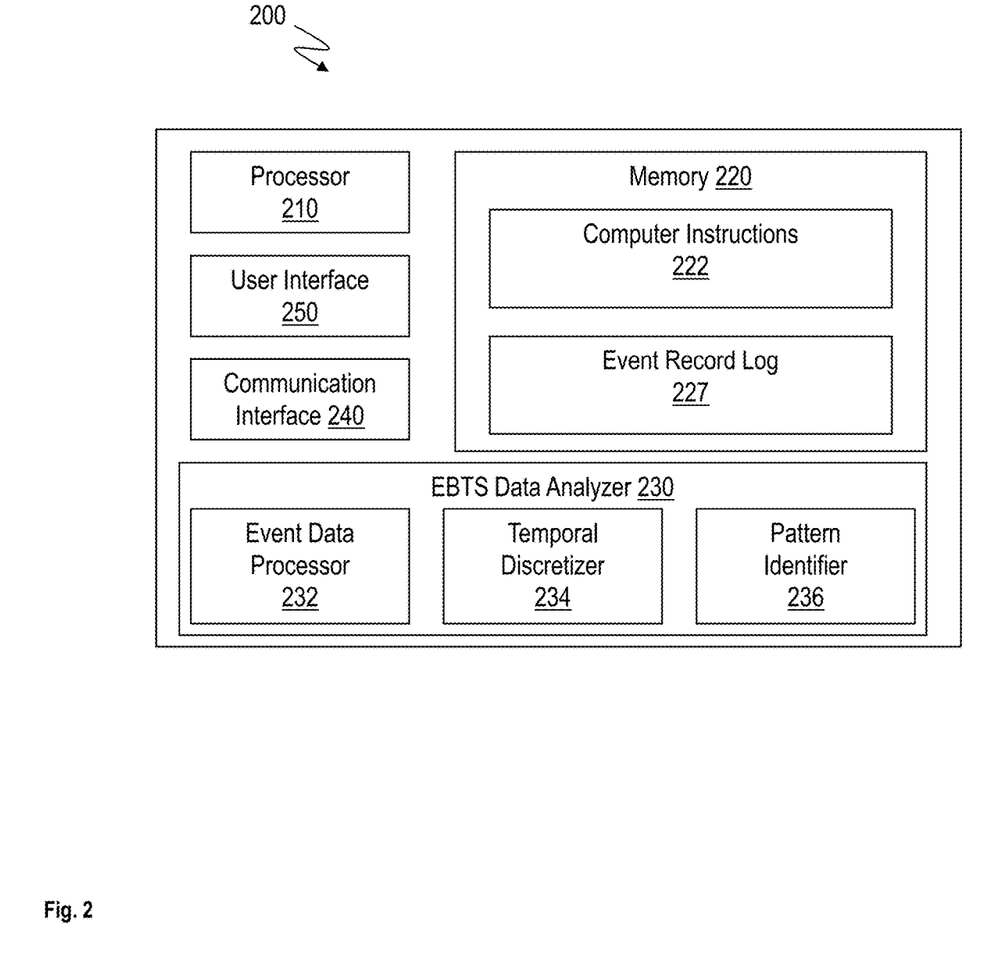
FIG. 2 illustrates a block diagram of an example system to analyze EBTS data in accordance with an embodiment.

FIG. 2 illustrates an example system 200 to analyze the EBTS data. The system 200 includes a processor 210, a memory 220, an EBTS data analyzer 230, a communication interface 240, and a user interface 250, among other components. The memory 220 may contain computer instructions 222 and an event record log 227 among other data.

The processor 210 may be a central processor of the system 200 responsible for execution of an operating system, the instructions 222, and any applications installed on the system 200. The processor 210 may be one or more devices operable to execute logic. The logic includes computer executable instructions or computer code embodied in the memory 220 or in other memory that when executed by the processor 210, cause the processor 210 to perform the features implemented by the logic. The computer instructions 222 include instructions executable with the processor 210. The computer instructions 222 may include embedded logic. The computer instructions 222 may be written in any computer language now known or later discovered, such as C++, C #, Java, Pascal, Visual Basic, Perl, HyperText Markup Language (HTML), JavaScript, assembly language, shell script, or any combination thereof. The computer instructions 222 may include source code and/or compiled code. The processor 210 may be a general processor, central processing unit, server, application specific integrated circuit (ASIC), digital signal processor, field programmable gate array (FPGA), digital circuit, analog circuit, or combinations thereof. The processor 210 may be in communication with the memory 220 and other components of the system 200.

The memory 220 may be non-transitory computer storage medium. The memory 220 may be dynamic random access memory (DRAM), static random access memory (SRAM), Flash or any other type of memory or a combination thereof. Along with the computer instructions 222, the memory 220 contains the event record log 227. The event record log 227 includes event records for the events 110a-e. For example, an event record for the event 110a may include raw data of the event 110a such as the event identifier, the event timestamp, the event value, the customer identification of the customer 102 associated with the event 110a, identification of a server that processes the transaction associated with the event 110a. The raw data may include additional data related to the data.

The EBTS data analyzer 230 analyzes the EBTS data 120 that is stored in the event record log 227. Alternatively or in addition, the EBTS data analyzer 230 analyzes EBTS data 120 that may be stored at other locations, such as a remote computer, or a portable memory.

The EBTS data analyzer 230 is a subsystem of the system 200 that analyzes the EBTS data. In an example, the EBTS data analyzer 230 includes hardware such as electronic circuitry, for example an application-specific integrated circuit (ASIC), a field programmable gate array (FPGA), a processor, or any other hardware. The EBTS data analyzer 230 also includes computer executable instructions that are executable by hardware to implement logic embedded in the instructions. For example, the instructions of the EBTS data analyzer 230 may be executable by the processor 210.

The EBTS data analyzer 230 may include an event data processor 232, a temporal discretizer 234, and a pattern identifier 236, among other components. The event data processor 232 is responsible to transform event data, such as from the event record log 227 from one format to another. The temporal discretizer 234 is responsible to discretize the event data that processed by the event data processor 232. The pattern identifier 236 is responsible to mine the discretized data to identify patterns of events which may be used to predict future events or other such applications.

The communication interface 240 is hardware that facilitates the system 200 to communicate with other hardware via a wired or a wireless network. For example, the communication interface is a network interface card (NIC) that sends/receives communication messages over a computer network using protocols such as transmission control protocol/internet protocol (TCP/IP), user datagram protocol (UDP), or any other protocol.

The user interface 250 may include a display, a speaker, a light emitting device (such as a light emitting diode), or any other component. The display may be touch screen enabled. The user interface 250 may include more or fewer devices than those shown and listed. For example, the user interface 250 may, alternatively, or in addition, include an antenna, a microphone, or any other component that may enable user interaction. The user interface 250 may be circuitry, such as processor, memory, communication interfaces, integrated circuits, antennas, resistors, capacitors, and any other hardware components. The user interface 250 may also include software. For example, the user interface 250 may involve instructions and/or data that may be stored on the memory 220. The instructions and/or data may control operations of the user interface 250.

Figure 3:
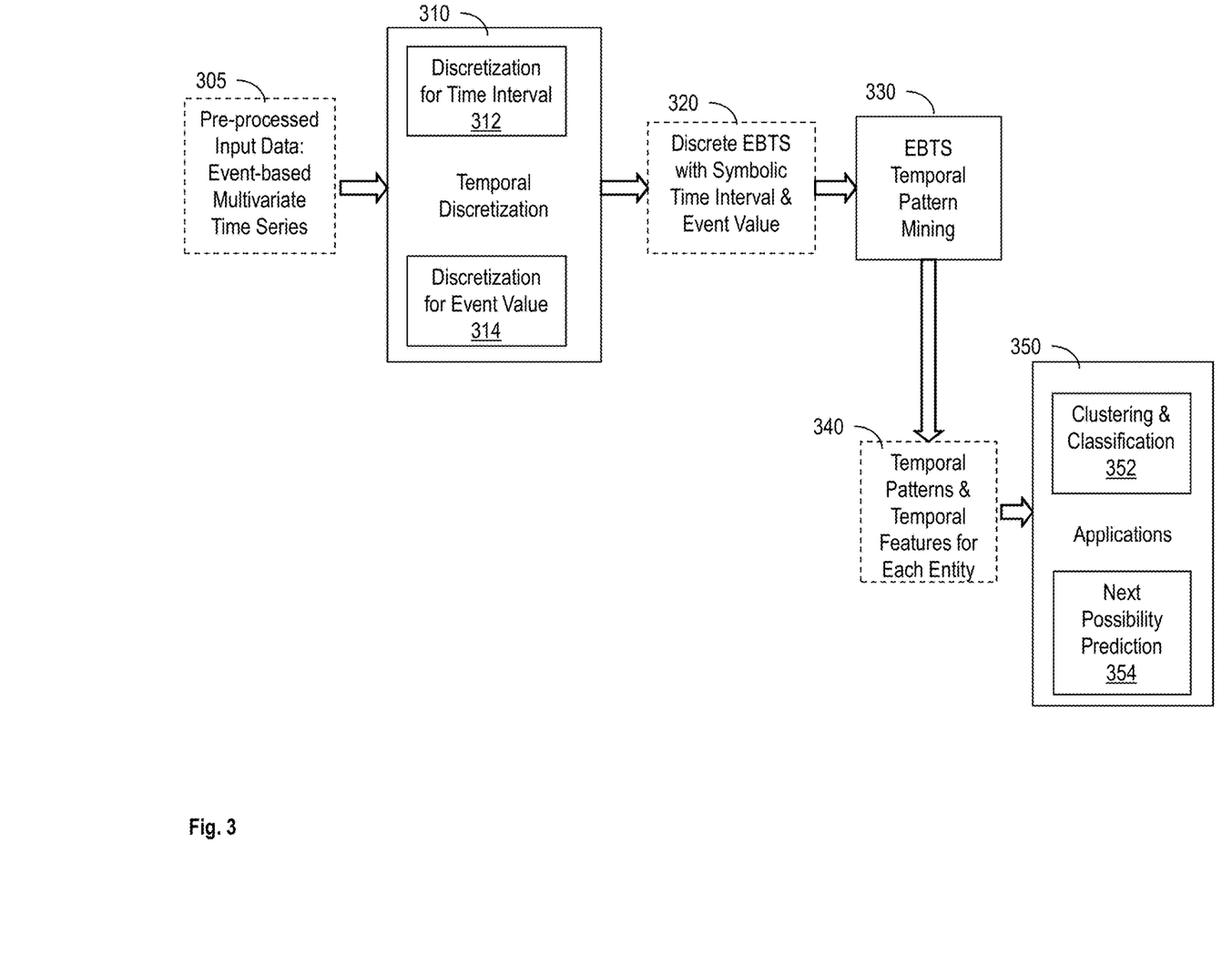
FIG. 3 illustrates an example flow diagram of logic for analyzing EBTS data in accordance with an embodiment.

FIG. 3 illustrates an example flow diagram of logic for analyzing the EBTS data. The logic is implemented by the system 200, such as by the EBTS data analyzer 230. In an example, the event data processor 232 preprocesses the event raw data in the event record log 227, as shown at 305. In the preprocessing, the event data processor 232 transforms the raw data to a data format, such as clean data, extracts data fields, and sorts the event data. For example, the event data processor 232 may sort the event data chronologically.

Figure 4:
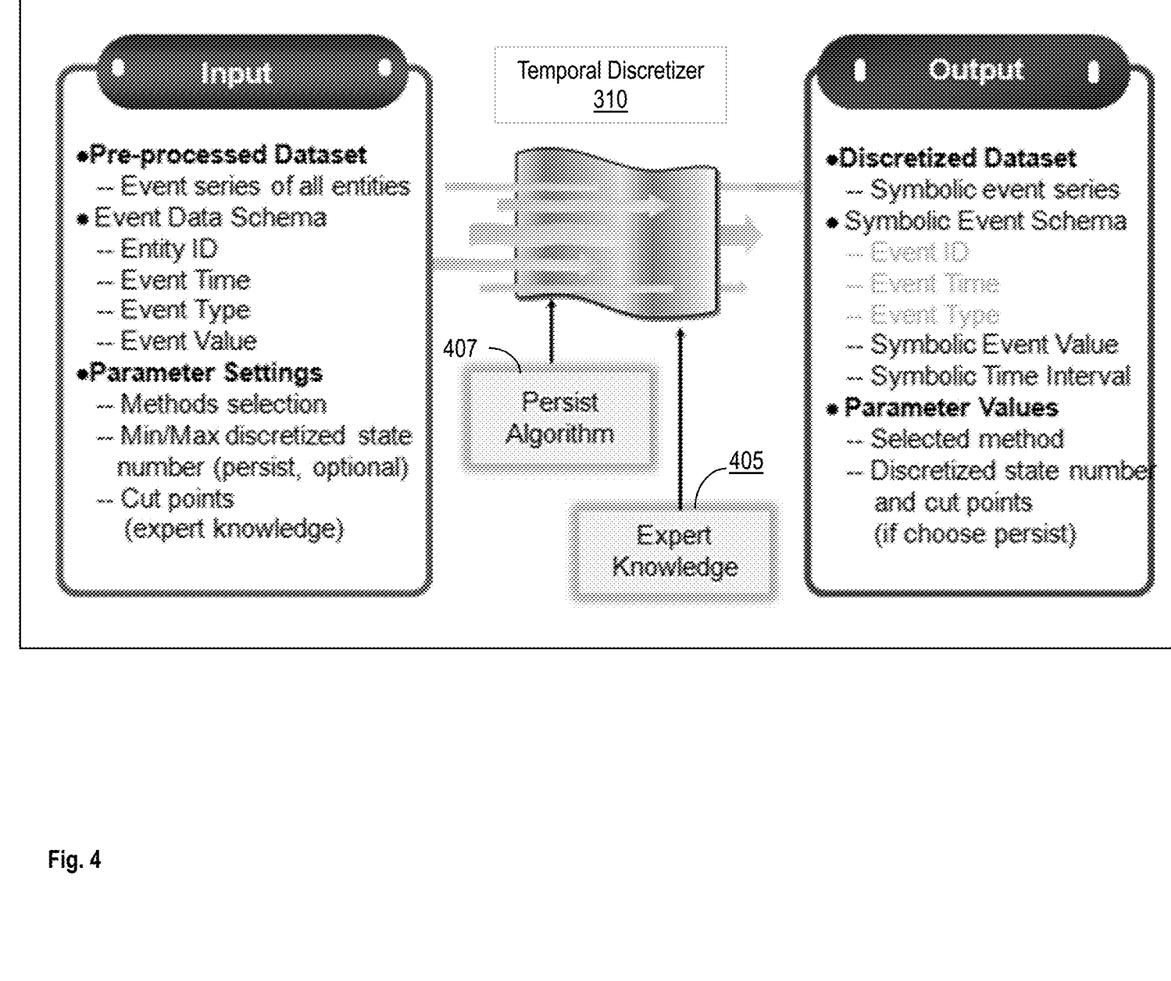
FIG. 4 illustrates an example temporal discretization in accordance with an embodiment.

The temporal discretizer 234 temporally discretizes the preprocessed data, as shown at 310. FIG. 4 illustrates an example temporal discretization. The temporal discretizer 234 may discretize the time durations and event values based on domain knowledge 405 or a predetermined algorithm 407, as shown at 312 and 314. For example, the temporal discretizer 234 may be instructed that the event data being discretized is banking related. In response, the temporal discretizer 234 discretizes the event data using the amount values of the transactions as the event values for discretization. In another example, if the event data is identified as data related to customer transactions at a gas station, the temporal discretizer 234 may discretize the event data based on type of the event (instead of amount values). That is, different event types, may have different cut point for event values. After discretization, the event data processor 232 further transforms the discretized data into symbolic value format, as shown at 320. The event data processor 232 uses predetermined event data schemas to process the event data, for example as illustrated in FIG. 4.

The pattern identifier 236 subsequently mines the discretized data to identify a temporal pattern and/or features as shown in 330 and 340. The pattern identifier 236 identifies temporal patterns from the discrete symbolic value data that was generated at 320. The temporal patterns identified are then used to cluster the event data and further predict next transaction in the EBTS, as shown in 340 and 350 (352 and 354). The time and value of the next transaction may be predicted along with other details such as type.

Figure 5:
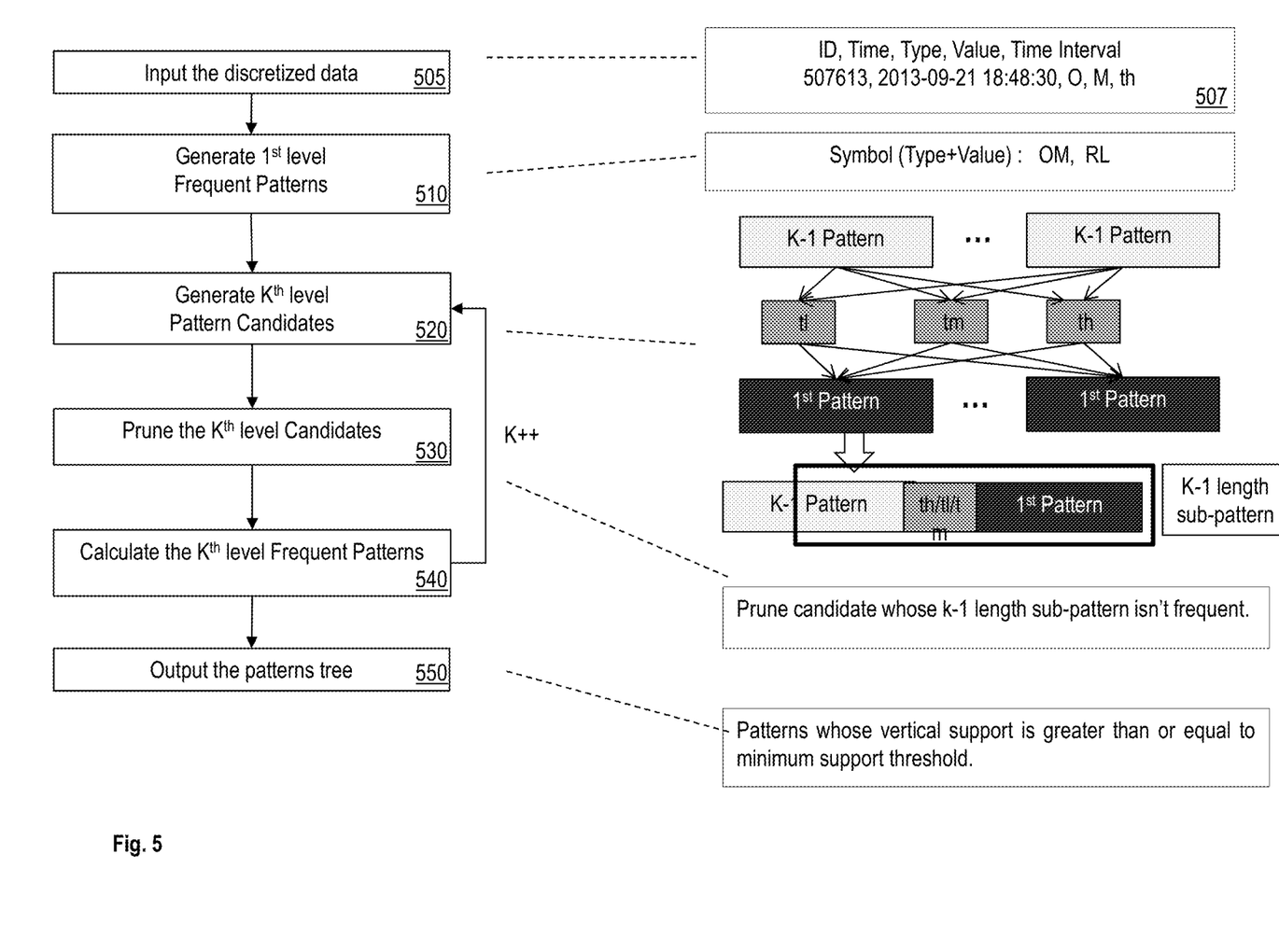
FIG. 5 illustrates a flowchart of example logic to generate a pattern from the discretized data in accordance with an embodiment.
Figure 6:
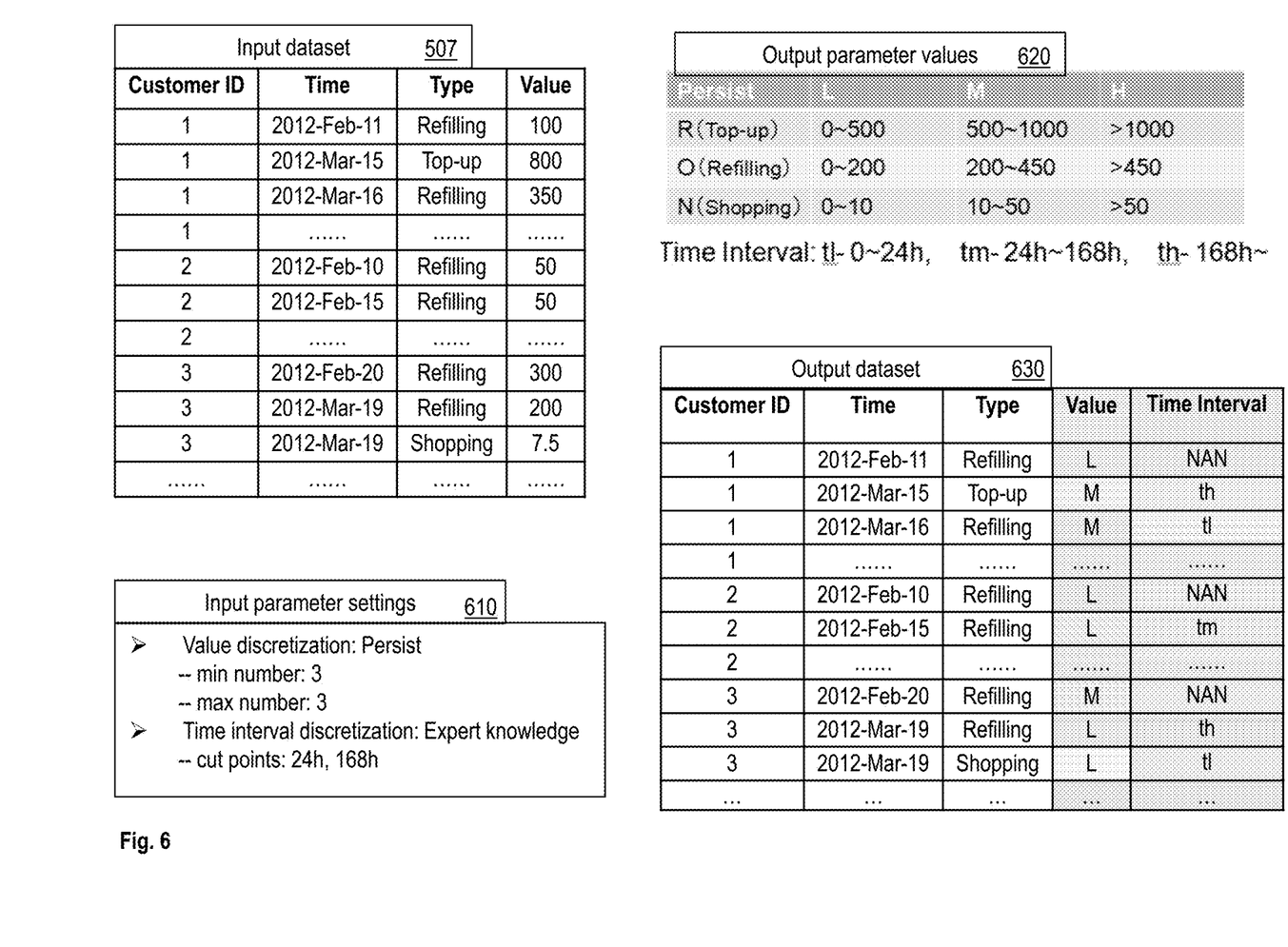
FIG. 6 illustrates data being manipulated by a system in accordance with an embodiment.

FIG. 5 illustrates a flowchart of example logic to generate a pattern from the discretized data. In conjunction, FIG. 6 illustrates data being manipulated by the logic of FIGS. 4 and 5. In FIG. 6, input data 507 and input parameter settings 610 are the input data and parameters for FIG. 4 temporal discretizer, and 620 and 630 is the output of discretization. Further 630 is input data for 505 of FIG. 5. The temporal discretizer 234 receives the input data, as shown in 505. The input data includes an event identifier, a timestamp, a type, an event value, and a time duration associated with each event, as shown in 507. Table 1 illustrates example input data for gas station customer transactions. The input data includes a large number of records, such as millions of customers to be analyzed; however, Table 1 illustrates just a small subset of the input data. As shown in Table 1, customer activities which reflect type of the respective events include refilling, top-up, and shopping. Each customer has a corresponding sequence of transactional events. Amongst the customers, since different customers have different behavior habits, the length, start time, and time duration are different.

The input data 507 includes input parameter settings 610. For example, the parameter settings 610 include cut points and other settings that are predetermined based on the type of events being analyzed.

TABLE 1

| Customer ID | Time | Type | Value |
|---|---|---|---|
| 1 | 2012 Feb. 11 | Refilling | 100 |
| 1 | 2012 Mar. 15 | Top-up | 800 |
| 1 | 2012 Mar. 16 | Refilling | 350 |
| 1 | ... | ... | ... |
| 2 | 2012 Feb. 10 | Refilling | 50 |
| 2 | 2012 Feb. 15 | Refilling | 50 |
| 2 | ... | ... | ... |
| 3 | 2012 Feb. 20 | Refilling | 300 |
| 3 | 2012 Mar. 19 | Refilling | 200 |
| 3 | 2012 Mar. 19 | Shopping | 7.5 |
| ... | ... | ... | ... |

Figure 7:
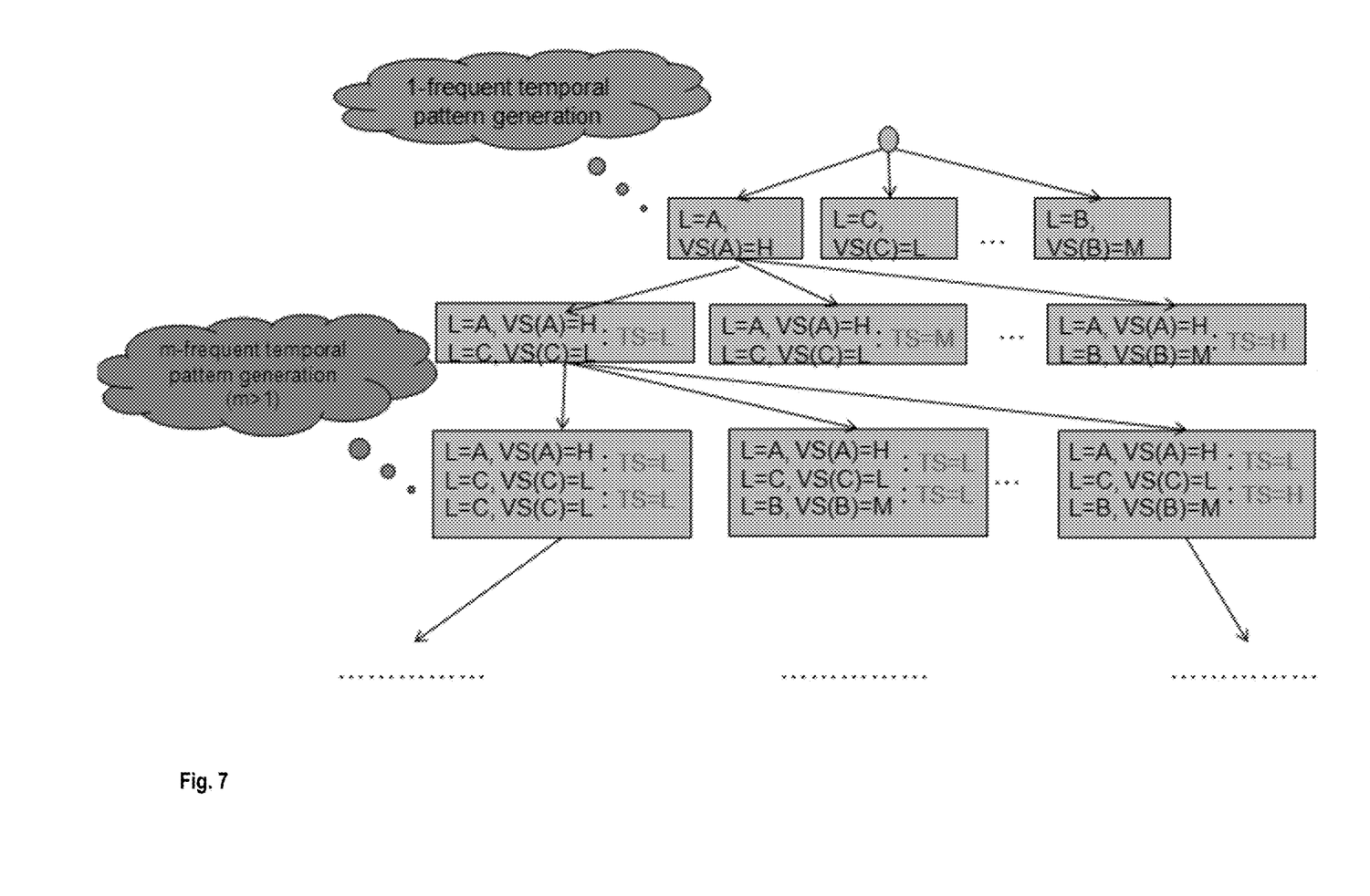
FIG. 7 illustrates different levels of patterns system in accordance with an embodiment.

The pattern identifier 236 generates first level frequent patterns based on the input data, as shown in 510. The first level patterns are based on event types and event values. The pattern identifier 236 continues to generate up to a k-level pattern candidates, as shown in 520. The number of levels to generate patterns is based on the input parameter settings 620, such as based on the type of events being analyzed. Alternatively, the algorithm iterates until there are no pattern candidates with support greater than a predetermined vertical support value. FIG. 7 illustrates different levels of patterns that the pattern identifier 236 generates. A first level pattern is based on frequency of a single symbol. An m-level pattern is based on frequencies of m symbols with m−1 time duration.

At each level, generated patterns are pruned, as shown in 530. For example the pattern identifier 236 prunes a k-level candidate in which a frequency of a k−1 length sub-pattern does not satisfy a predetermined threshold. For example, in a k-level pattern, the pattern identifier 236 detects a k−1 level pattern and a frequency of the k−1 level pattern. If the frequency of the k−1 level pattern is below the predetermined threshold, the k-level pattern containing that k−1 level pattern is not considered as a target. The k-level candidates that are not pruned are then used for a next iteration in which the k+1 level patterns are generated and pruned based on frequencies of the k-level patterns, as shown in 530 and 540, where 540 is to calculate the kth level frequent patterns.

In an example, the pattern identifier 236 receives output parameters that indicate classification of the event data. For example, as shown in 620, the output parameters of the temporal discretizer 234 may indicate that a top-up transaction in a gas station be represented as 'R', a refilling transaction as 'O', and a shopping transaction as an 'N'. Further, the output parameters 620 indicate which event values should be categorized as L, M, and H, for each of these transactions. For example, a shopping transaction (N) amounting more than $50 is categorized as H. The output parameters 620 also indicate which time durations are categorized as tL, tM, and tH. Events occurring more than 168 hours apart lead to a tH categorization of the time duration, as shown in 620. Based on the output parameters 620, the pattern identifier outputs an output dataset 630.

Figure 8:
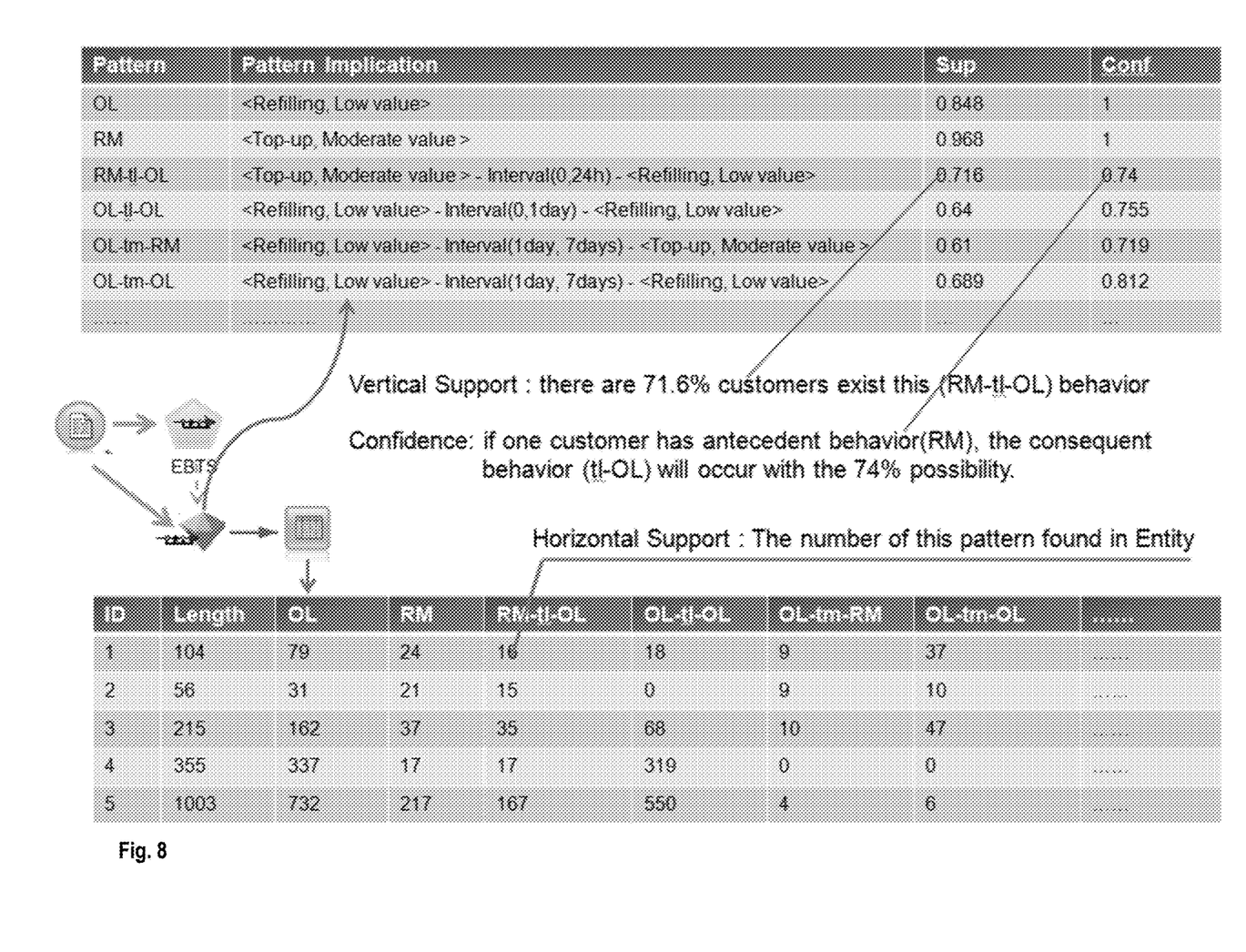
FIG. 8 illustrates identifying the patterns to be outputted in accordance with an embodiment.

The pattern identifier 236 further analyzes the output dataset 630 to identify patterns in sequences of events, and corresponding implications and outputs the identified patterns, as shown in 550. FIG. 8 illustrates identifying the patterns to be outputted in the gas station example. For each k-level pattern that was identified, the pattern identifier 236 determines a corresponding vertical and horizontal support value. The vertical support indicates a number of customers that display behavior of the pattern. The horizontal support indicates a number of times that pattern was found for a particular customer. For example, as illustrated in FIG. 8, 71.6% customers have followed the pattern RM-t1-OL. This particular pattern in this scenario indicates a customer who has topped up (R) paying a moderate price (M), and after a low interval of time (t1) return for refill (O) at a low price (L). In this scenario, customer with customer-id 1, has followed this pattern 16 times so far. The pattern identifier 236, based on this information further determines a confidence level for predicting that a customer will perform a particular transaction. For example, in this scenario, the pattern identifier 236 predicts that for a customer who has topped up at a moderate price (RM) there is a 74% chance that the customer will return in a short interval to refill at a low price.

Figure 9:
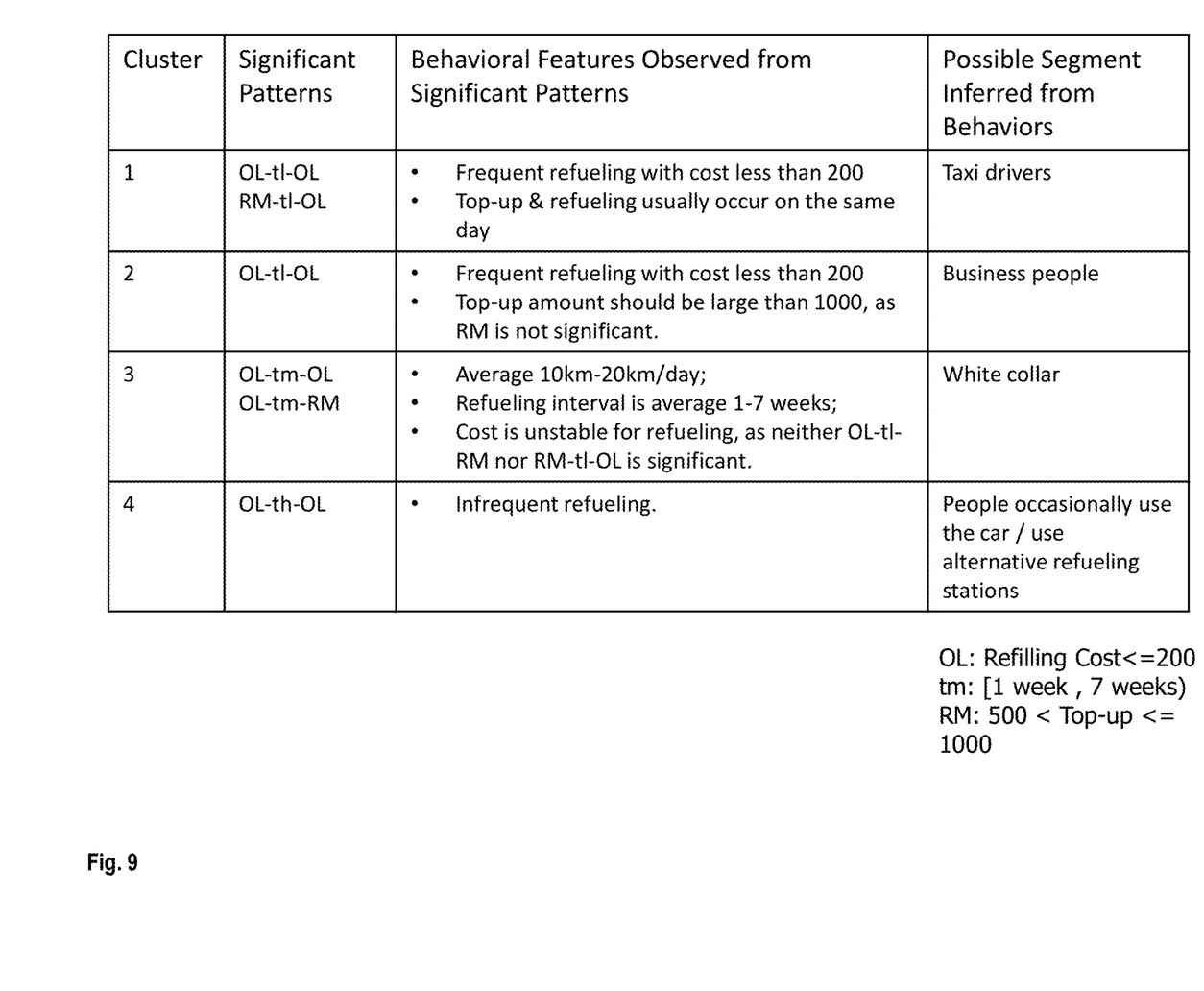
FIG. 9 illustrates various patterns and corresponding clusters in accordance with an embodiment.

Further yet, the pattern identifier 236 clusters the patterns generated to infer segments of transactions or customers. FIG. 9 illustrates various patterns and corresponding clusters in the gas station scenario. For example, the pattern identifier 236 performs churn analysis, to identify types of customers. For this, the pattern identifier may set different threshold to different cluster. For example, a customer in cluster 1 may be regarded as lost if s/he didn't come in the last 2 months. Another customer in cluster 4 may come to refuel every 2 months.

The system 200 further identifies a personalized promotion or incentive to be used to reduce customer loss or increase customer loyalty. For example, the system 200, based on the patterns generated and the predictions made based thereupon, identifies that for customers in clusters 1 and 3, giving double credits for top-up increases the one-time top up value. That is, by giving double credits, the customers in those clusters may spend more for a one-time top up. The system 200 further identifies that customers in cluster 2 are high value customers and sending gifts to customers in cluster 2 maintains their loyalty. The system 200 identifies that customers in cluster should be further analyzed to determine a reason why they visit the gas station occasionally.

Thus, the technical solutions described herein provide a method to find association rules/patterns based on all entities' historical transaction data (event-based time series) in any specific period of time by transforming raw data to a data format which includes each entity's sorted transaction history with corresponding timestamps, event types, and event values. The method further includes discretizing the time durations and event values such that the data is represented by discrete symbolic values. Thus, system 200 generates a symbolic pattern representing the events by parsing the event information. The method also includes generating temporal patterns systematically from one event to k events with k−1 intervals. The method also includes distinguishing failure type events, which occur after a list of voluntary events, as consequence of a temporal pattern that precedes the failure event. The resulting temporal patterns are identified as attributes for each entity, and used to cluster the entities. The method may include, segmenting and forecasting actions to take for each entity based on the clustering. The technical solutions also provide a system and other products to find association rules/patterns based on the entities' historical transactions. The entities are customers and transactions are interactions with a business such as commercial transactions, customer service interaction and other such events.

Thus, the technical solutions generate temporal patterns in event-based time series based on event values and time durations between two events. The technical solutions are beneficial for a business such as a bank, an oil/gas station, a shopping store, an airline, or any other business to improve customer retention. The technical solutions described take the event value and time duration into consideration to identify the patterns that include the events, event values, and time durations between two events. The time duration and event value are discretized first and a K length pattern is comprised with K number of symbolic event linked with discretized event value and K−1 number of discretized time duration. Further, the events happen instantaneously and considering event values linked with events and time duration between adjacent events.

Accordingly, the technical solutions find one or more association rules/patterns based on all entities' historical transaction data (event-based time series) in any specific period of time. The patterns are identified by transforming raw data to a data format which includes each entity's sorted transaction history with time happened, event types and event values. The time durations and event values are discretized such that the data is in discrete symbolic values. The temporal patterns are generated from one event to k events with k−1 intervals. The technical solutions also identify failure events, which occur after a list of voluntary events and typically, are consequential to the temporal pattern of voluntary events. The resulting temporal patterns are assigned or made attributes of a corresponding entity, and used to cluster, or segment the entities. Further, based on the clustering and the temporal patterns, a next transaction for an entity can be forecasted. The technical solutions thus facilitate customer behavior analysis, preventive maintenance, cross selling and other such marketing/sales operations. For example, a frequent pattern is mined to predict the next transaction for a new entity by matching the antecedent. For example, if a pattern such as RM-t1-OL is frequent with support=0.5, and confidence=0.8, then for a new entity, if on occurrence of an RM transaction, the system may predict that after a predetermined interval of time the new entity will perform an OL transaction with a probability of 0.8.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application, or technical improvement over technologies found in the marketplace, or to enable others of ordinary skill in the art to understand the embodiments disclosed herein.

What is claimed is:

1. A computer product for event-based time-series pattern identification, the computer product comprising non-transitory computer readable storage medium, the non-transitory computer readable storage medium comprising computer executable instructions, wherein the non-transitory computer readable storage medium comprises instructions to:
   parse event information, wherein the event information comprises information about transactions performed by a plurality of customers, and the information corresponding to a transaction comprises a plurality of attributes comprising a customer identifier, a timestamp, and a transaction value of the transaction, the transaction value comprising a categorical monetary value;
   identify a sequence of transactions performed by a first customer from the plurality of customers based on the parsing of the event information including the transaction value comprising the categorical monetary value, wherein the transactions are performed at discrete times, and are not evenly spaced;

discretize the sequence of transactions performed by the first customer into a plurality of symbolic pattern data structures using a k-level hierarchical combination of symbols representing the plurality of attributes including the transaction value comprising the categorical monetary value, the categorial monetary value comprising a low monetary category, a medium monetary category, and a high monetary category, the discretization comprising:
  at level 1 of the k-level hierarchical combination, generating a plurality of symbol patterns, each symbol pattern corresponding to a transaction in the sequence of transactions, each symbol pattern including a plurality of symbols comprising a first symbol representing a transaction-type;
  at a level 2 of the k-level hierarchical combination, filtering the sequence of transactions by pruning the symbol patterns that occur less than a predetermined frequency threshold in the plurality of symbol patterns for level 1; and
  updating the plurality of symbol patterns that have not been pruned by adding a second symbol representing a transaction-value, wherein an individual symbol pattern of the plurality of symbol patterns comprises the transaction-type paired with the transaction-value selected from the group consisting of the low monetary category, the medium monetary category, and the high monetary category;
  at a level 3 of the k-level hierarchical combination, filtering the sequence of transactions by pruning the symbol patterns that occur less than a predetermined frequency threshold in the plurality of symbol patterns for level 2; and
  updating the plurality of symbol patterns that have not been pruned; and
predict a time and transaction value of a future transaction for the first customer based on the discretized sequence of transactions; and
determine that a failure event occurs as a consequence of a pattern of the discretized sequence of transactions.

2. The computer product of claim 1, wherein the non-transitory computer readable storage medium further comprises instructions to determine an incentive to offer the first customer based on the predicted time and transaction value.

3. The computer product of claim 1, wherein the non-transitory computer readable storage medium further comprises instructions to determine vertical support for each symbolic pattern data structure, the vertical support representing a number of customers that have performed the sequence of transactions represented by the symbolic pattern data structure.

4. The computer product of claim 1, wherein the non-transitory computer readable storage medium further comprises instructions to determine horizontal support for each symbolic pattern data structure, the horizontal support representing a number of times that each customer has performed the sequence of transactions represented by the symbolic pattern data structure.

5. The computer product of claim 1, wherein the non-transitory computer readable storage medium further comprises instructions to:
  determine a plurality of clusters based on one or more threshold values; and
  identify one or more symbolic pattern data structures representing each cluster from the plurality of clusters.

6. The computer product of claim 1, wherein the plurality of attributes further comprise identification of a computer system that processed the transaction.

7. The computer product of claim 1, wherein the transaction value comprises a dollar value.

8. The computer product of claim 1, wherein the transaction value comprises a purchase value.

9. The computer product of claim 1, wherein the transaction is an event that has occurred.

10. The computer product of claim 1, further comprising generating first level patterns based on event types and transaction values, the first level patterns comprising coded representations for the categorical monetary value for each of the event types.

11. The computer product of claim 1, wherein the pattern of the discretized sequence of transactions are voluntary events representative of transactions that a customer undertook voluntarily.

12. The computer product of claim 1, wherein the failure event is in response to a failure.

13. The computer product of claim 1, further comprising determining clusters of the plurality of symbol patterns, the clusters being based on different thresholds; and
  providing a first type of incentive for a first cluster of the clusters, a second type of incentive for a second cluster of the clusters, and a third type of incentive for a third cluster of the clusters.

14. The computer program product of claim 1, wherein the individual symbol pattern further comprises the transaction-type and the transaction-value concatenated with another transaction-type paired with another transaction-value selected from the group consisting of the low monetary category, the medium monetary category, and the high monetary category.

* * * * *